Sept. 1, 1931.  J. A. WRIGHT  1,821,458
STEERING MECHANISM
Filed April 29, 1929  2 Sheets-Sheet 1

INVENTOR.
JAMES A. WRIGHT.
By
ATTORNEY.

Sept. 1, 1931.    J. A. WRIGHT    1,821,458
STEERING MECHANISM
Filed April 29, 1929    2 Sheets-Sheet 2

INVENTOR.
JAMES A. WRIGHT
By

ATTORNEY.

Patented Sept. 1, 1931

1,821,458

UNITED STATES PATENT OFFICE

JAMES A. WRIGHT, OF MONTREAL, QUEBEC, CANADA

STEERING MECHANISM

Application filed April 29, 1929. Serial No. 359,008.

This invention relates to the steering mechanism of motor vehicles and particularly to means for the differential control of the wheels in the operation of turning the vehicle.

The object of the invention is to provide improved means for steering motor vehicles, whereby the wheels, in turning the vehicle, are pivoted at differential angles, and are directed to the true direction of their relative paths of travel.

A further object, is to provide a simple, durable and more efficient means of controlling the pivoting of the steering wheels, in order to secure greater safety, smoother running of the vehicle, the minimum stresses on the chassis, greater flexibility in turning, and also to prevent skidding and shimmy.

Hitherto, it has been the practice in steering a motor vehicle, to pivot both front wheels at the same angle when turning, with the result that one of them was not directed to travel on its true curve of movement, and a certain amount of side-slippage had to take place. In pivoting wheels coupled in parallel, the inner wheel on turning is the direction controlling wheel, while the outer wheel is a follower which is out of alignment with its travel curve, being directed at an angle inwardly across its path of travel, and it is therefore obliged to side-slip in following that path.

By means of this invention, however, each wheel is pivoted differentially to direct it to travel on its own radial path, with the result that each is a guiding wheel and maintains perfect road grip during the turning movement, and side-slippage is eliminated.

Figure 1:
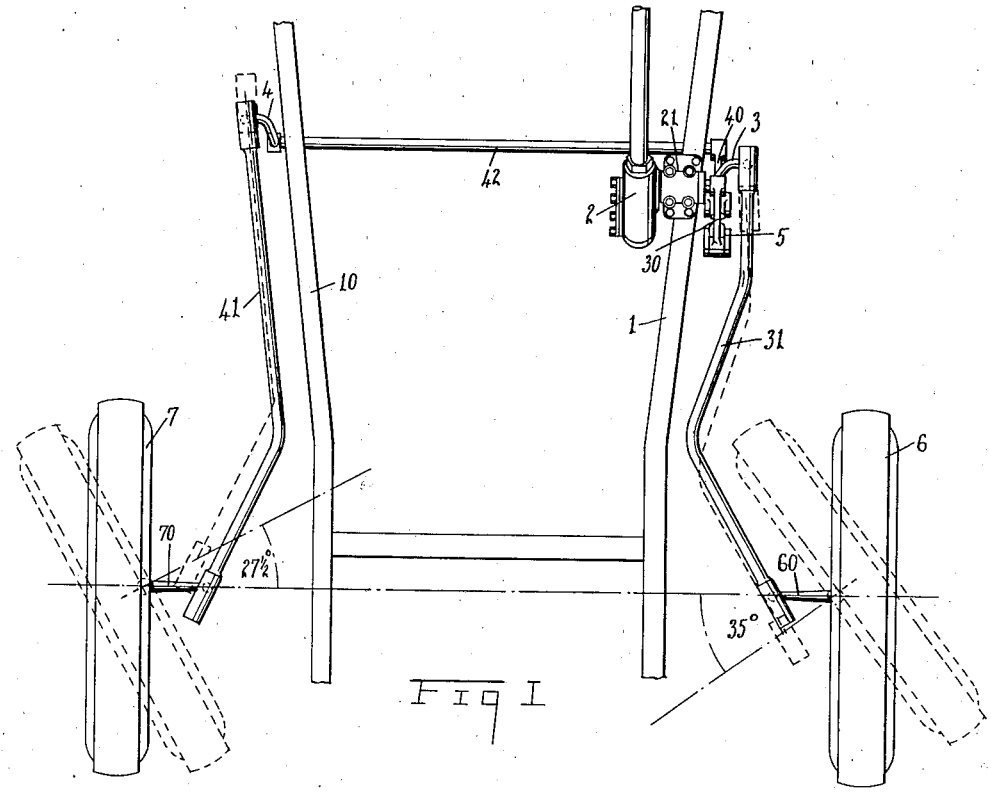
Figure 2:
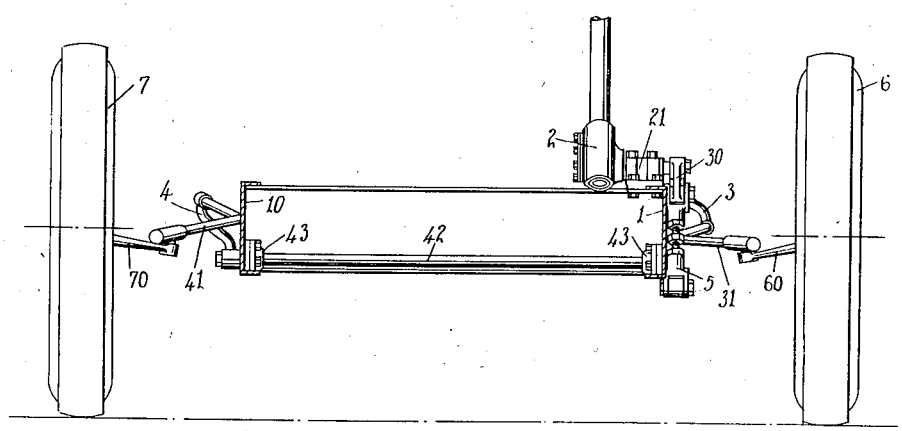
Figure 3:
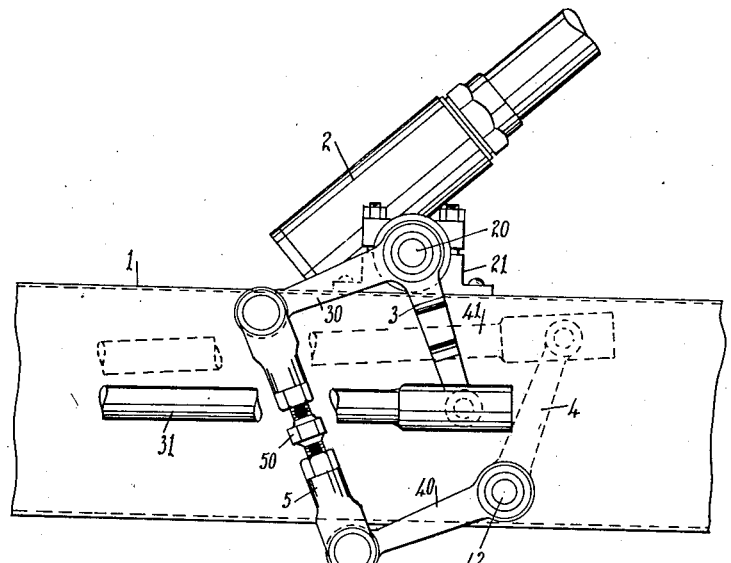
Figure 5:
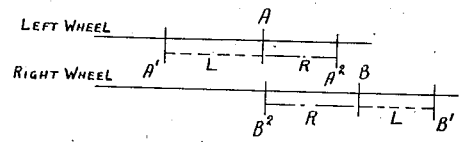
Figure 4:
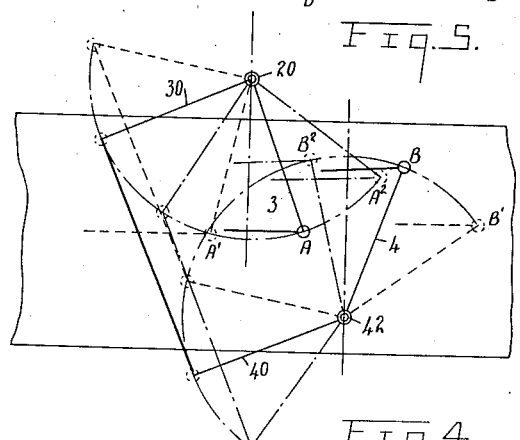
Figure 6:
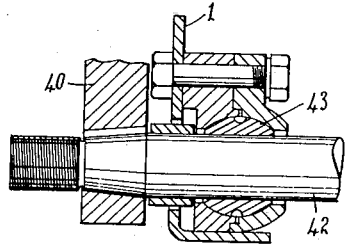

Reference is made to the accompanying drawings, in which:

Figure 1 is a plan view of the device.
Figure 2 is a front view of the same.
Figure 3 is a detail side view of the linkage.
Figure 4 is a diagram of Figure 2.
Figure 5 is a complementary diagram.
Figure 6 is a cross section of the bearing of the transverse shaft.

In Figure 1 the side channels 1 and 10 of the chassis frame are shown, with the steering gear 2 and bearing 21 of its shaft 20 mounted on the side channel 1. The steering lever 3, keyed on the outer end of the shaft 20, has a lever arm 30 at right angles to it, forming a bell-crank lever.

A transverse shaft 42 is journalled in bearings 43 on each side channel 1 and 10, and has keyed to its ends, the steering level 4, outside the channel 10, and the lever arm 40, outside the channel 1. A turnbuckle 5, with forked ends and an intermediate adjustment nut 50, links the ends of the lever arms 30 and 40.

A drag link 31 connects the steering lever 3 with the steering knuckle 60 on the hub of the wheel 6. A similar drag link 41 connects the steering lever 4 with the steering knuckle 70 of the wheel 7.

The wheels 6 and 7 are pivoted free from hindrance to separate control and are preferably independently sprung.

In Figure 3 is shown the adjustable linkage between the shaft 20 and the transverse shaft 42 and the normal setting of the steering levers 3 and 4. The lever 3 is keyed on the shaft 20 to hang downwards at an angle of about 20° to the rear, while the lever 4 is keyed to the shaft 42 to project upwards at the same angle to the rear. The turnbuckle 5 links the lever arms 30 and 40 normally in parallel.

Referring now to the diagram Figure 4, when A, which represents the end of the steering lever 3, is moved forward past the vertical to A', B moves rearward to B', the same angular distance but a shorter horizontal distance, as shown in Figure 5, where L represents the left hand turn of the vehicle. The reverse is the case when A is moved backwards to $A^2$ and B moves forward past the vertical to $B^2$, as shown in Figure 5, where R represents the right hand turn of the vehicle. There is therefore a differential variation between the horizontal movements of the ends of the two steering levers 3 and 4, and of the drag links 31 and 41 coupled to them.

Looking now at Figure 1, if the steering gear is operated to move the drag link 31 forward and make the wheel 6 pivot an angle of 35° outwards, at the same time the drag link 41 will move backward and make the wheel 7 pivot inwards but only to an angle of 27½°. The same result will occur in proportion during shorter operations of the steering gear.

Now in turning a vehicle, the outer wheel must travel on a much larger arc than that of the inner wheel, and therefore the outer wheel requires to pivot less to follow its path on that arc.

With each wheel correctly set to follow its own arc when turning the vehicle, there will be no side slippage and each wheel will maintain a perfect road grip. This will improve the steering control, and thereby provide increased safety, while owing to the elimination of side slippage, the wear on the tires will be reduced. As with this invention each wheel is a steering wheel, even in the event of one of them becoming loose, steering control would still be preserved through the other wheel.

It is obvious that this system of steering control could be readily applied to the rear wheels as well as to the front wheels.

What I claim is:—

1. In a steering mechanism for motor vehicles, a steering gear, a steering lever operated thereby, a second steering lever mounted on the end of a transverse shaft journalled in the side members of the chassis frame, on the opposite side thereof, a lever on the end of said shaft adjacent the first steering lever and an adjustable linkage between the first steering lever and the adjacent lever on the transverse shaft adapted to rotate the steering levers oppositely and to exert by them differential pivoting of the steering wheels.

2. In a steering mechanism for motor vehicles, a steering gear, a steering lever operated thereby in the form of a bell crank lever, a turnbuckle coupling to the bell crank lever, a lever arm coupled to the turned buckle mounted on the end of a transverse shaft journalled in the side members of the chassis frame, a steering lever on the other end of the shaft outside the frame, and drag links connecting the steering levers with the steering knuckles of their respective steering wheels.

3. In a steering mechanism for motor vehicles, adapted to provide differential pivoting of the steering wheels, a steering gear, steering levers pivoted on separate axes on each side of the chassis frame, having connecting linkage, normally set at an equal angle from the vertical through their axes, and operated by the steering gear, the one to rotate towards its vertical and the other to rotate away from its vertical, and means to adjust the set of steering levers.

JAMES A. WRIGHT.